United States Patent [19]

Akai

[11] Patent Number: 4,824,284

[45] Date of Patent: Apr. 25, 1989

[54] PURIFYING SYSTEM OF WATER AREA

[76] Inventor: Kazuaki Akai, 201 Ogura, Wakayama, Japan, 649-62

[21] Appl. No.: 928,735

[22] Filed: Nov. 10, 1986

Related U.S. Application Data

[63] Continuation of Ser. No. 610,280, May 1, 1984, abandoned.

[51] Int. Cl.⁴ .............................................. E02B 3/06
[52] U.S. Cl. ....................................... 405/21; 405/15; 405/52
[58] Field of Search ....................... 405/15, 16, 21, 23, 405/25, 26, 27, 28, 30–35, 52, 60, 63, 64, 74

[56] References Cited

U.S. PATENT DOCUMENTS

| 949,933 | 2/1910 | Kellner | 405/32 |
| 1,840,271 | 1/1932 | Falley | 405/28 |
| 1,849,323 | 3/1932 | Cleveland et al. | 405/32 |
| 1,969,123 | 8/1934 | Doble | 405/32 X |
| 2,474,786 | 6/1949 | Humphrey | 405/30 |
| 3,564,853 | 2/1971 | Csiszar | 405/32 |
| 4,279,535 | 7/1981 | Gagliardi et al. | 405/32 X |

FOREIGN PATENT DOCUMENTS

| 1941076 | 9/1979 | Fed. Rep. of Germany | 405/60 |
| 2227750 | 11/1974 | France | 405/63 |
| 2293527 | 7/1976 | France | 405/60 |

*Primary Examiner*—Dennis L. Taylor
*Attorney, Agent, or Firm*—Foley & Lardner, Schwartz, Jeffery, Schwaab, Mack, Blumenthal & Evans

[57] ABSTRACT

An enclosure for an area of water is fabricated from a porous breakwater which breaks waves of the water thus aerating same. Water passing through the breakwater is oxidized. The breakwater completely surrounds an area to be purified by means of aeration and oxidation.

4 Claims, 1 Drawing Sheet

PURIFYING SYSTEM OF WATER AREA

This application is a continuation of application Ser. No. 610,280, filed May 1, 1984 abandoned.

BACKGROUND OF THE INVENTION

The invention concerns a breakwater enclosure for seas and/or lakes which serves to simultaneously condition water and dissipate wave energy within the enclosure.

Erosion of shorelines has attracted attention recently as a problem to be dealt with technically. Several kinds of screening and breakwater devices have been developed and employed in both riparian and standing-water environments. In U.S. Pat. No. 3,564,853, Csiszar discloses a submerged flexible screen which induces waves to break before reaching a natural shoreline. Doble in U.S. Pat. No. 1,969,123 teaches a porous wave eliminator which brakes waves and retains sand in front of a beach or shore to be protected. In U.S. Pat. No. 2,474,786, Humphrey discloses a cellular breakwater with the same advantages as the Doble system and which presents an irregular surface to wave fronts so as to limit undermining of the breakwater. Several devices for use in preventing erosion to river banks and other flowing-water environments have been developed.

Water pollution is another serious problem, particularly in seas and lakes. Most commonly, the problem of water pollution is not premanently addressed, and while steps may be taken to fix an immediate problem, there is not provided any means for maintaining the long-term purity of the water.

SUMMARY OF THE INVENTION

An important object of the invention is to provide for the on-going prevention of water pollution and shoreline erosion in a specific area of a sea or lake. An additional object is to shield the subject body of standing water from excessive wave energy. A further object is to preclude intrusion of undesirable or dangerous waterlife, such as red tide plankton or sharks, into the subject area while allowing retention of desirable lifeforms within the area.

The objects mentioned above, and others not mentioned, can be achieved by completely surrounding the part of an open-water area not already bordered by a natural shoreline or an existing breakwater or seawall with a porous breakwater. Waves breaking over the breakwater help aerate the enclosed water. In addition, plankton and other organics entering the enclosure are eaten or absorbed by fish, shellfish and aquatic vegetation residing in voids within the breakwater itself. These also help flocculate contaminants which do pass the breakwater. The calmness of the water inside the enclosure facilitates sedimentation of such pollutants as well as of silt and clay and generally lowers water turbidity.

BRIEF DESCRIPTION OF THE DRAWINGS

The nature of the invention will be more easily understood from reference to the attached drawings, described below.

DETAILED DESCRIPTION OF THE PREFERRED EMBODIMENTS

Figure 1:
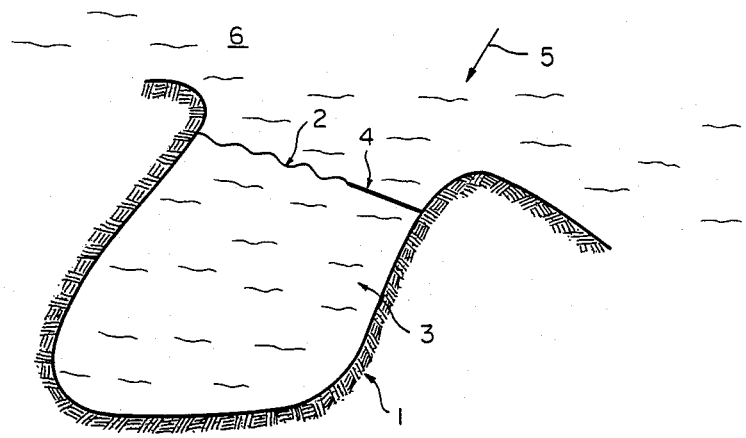
FIG. 1 shows how the invention may be applied to an embayment.

FIG. 1 shows a natural shoreline 1 and a carefully emplaced porous breakwater 2 which are used in conjunction to enclose an area 3 of a lake or sea to be protected and purified. Existing jetties, seawalls, and/or breakwaters 4 may also be used to reduce the length of newly-added breakwater needed to complete the enclosure.

Waves 5 breaking across the breakwater 2 aerate the water at the wave-break line. Since the energy of the waves is dissipated at the breakwater, the water within the enclosure remains calm. This both makes aquatic activities such as fishing, swimming and water-skiing safer and helps keep the water clean and clear by allowing sedimentation of agents which otherwise makes the water turbid. In the case shown in FIG. 1, the wave-breaking action also protects the shoreline itself.

The breakwater 2 enclosing area 3 tends to harbor all kinds of aquatic life. The breakwater 2 thus has the effect of removing many articles and substances—whether sealife or flotsam—from the water entering the enclosure 3. In addition, the enclosed area 3 will remain free of undesirable aquatic life, even that living immediately outside the breakwater, and can be used as a haven for desirable commercial or game fish or shellfish.

It should be noted that the optimum porosity and depth of the breakwater 3 is determined by many factors, including the following: enclosure area and depth, natural water quality, wave energy, breakwater length, and tidal variation and magnitude.

Figure 2:
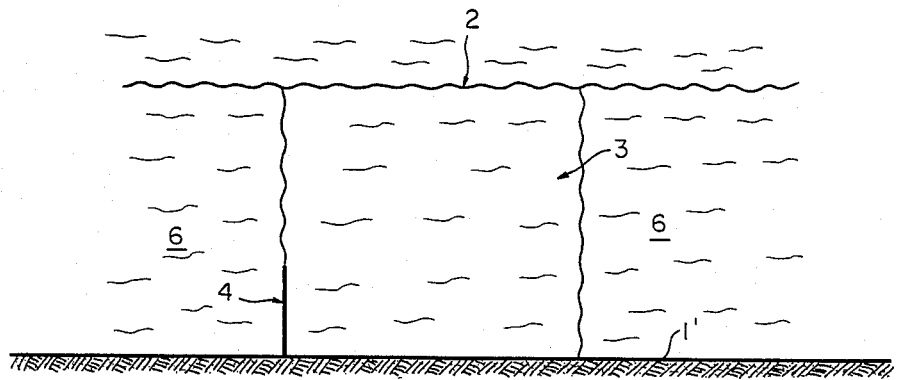
FIG. 2 shows how the invention may be applied to one or more stretches of shoreline.

FIG. 2 shows a straight stretch of beach having a shore line 1' enclosed within a porous breakwater 2. The beneficial effects of this embodiment will match those of the embodiment of FIG. 1.

Figure 3:
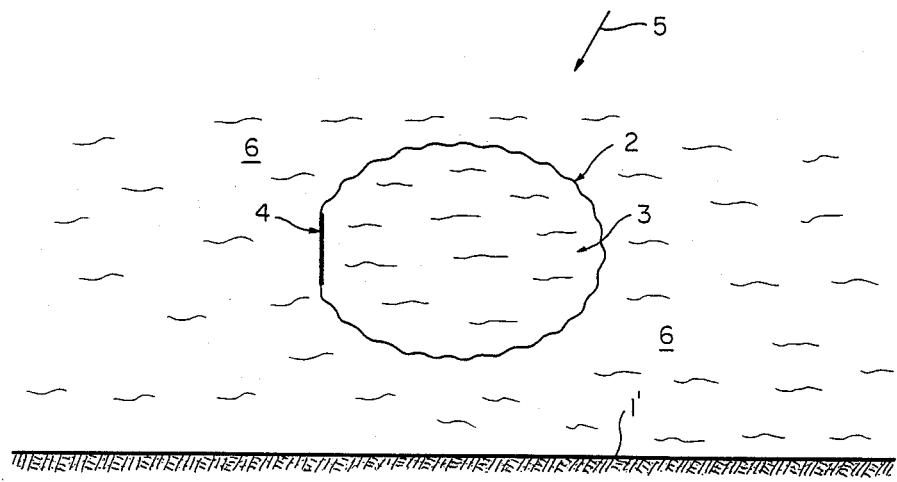
FIG. 3 shows show the invention may be applied to a region of water off-shore.

FIG. 3 shows how the invention might be used for an off-shore region 3 wherein breakwater 2 together with an existing dike or breakwater 4 completely encloses the water region 3 off-shore of shoreline 1'.

In the FIGS. 1–3, reference number 6 indicates the water region outside the enclosure found by the breakwater.

I claim:
1. A water purification system for flowing water comprising:
   a porous breakwater surrounding a predetermined water area for blocking direct communication of water inside of said surrounded area and outside of said surrounded area and allowing water inside of said surrounded area and outside of said surrounded area to pass the porous structure of said breakwater for communication therebetween said breakwater incorporating:
   means for breaking waves of said water outside of said surrounded area and thus causing aerating of said breaking water, said wave breaking means providing sufficient oxygen in said breaking water for maintaining microorganisms in said porous structure; and
   means defining water flow gaps in said breakwater for passing said water inside and outside of said surrounding area therethrough, said water flow gaps being so constructed to allow said microorganisms to live therein and thus causing catalytic oxidation of said water passing therethrough, said breakwater purifying same by said aeration and oxidation.

2. The enclosure of claim 1, wherein the breakwater is used in conjunction with a natural shoreline of the area of water so that the shoreline and the breakwater together completely surround the area of water.

3. The enclosure of claim 1, wherein the breakwater is used in conjunction with an existing artificial aquatic structure such as a dike breakwater or the like so that said structure and the breakwater together completely surround the area of water.

4. The enclosure of claim 2, wherein the breakwater is used in conjunction with an existing artificial aquatic structure such as a dike, breakwater or the like and with the natural shoreline of the area of water so that said structure, the shoreline and the breakwater together completely surround the area of water.

* * * * *